United States Patent [19]

Borschert et al.

[11] Patent Number: 5,680,916
[45] Date of Patent: Oct. 28, 1997

[54] MOTOR VEHICLE CLUTCH ASSEMBLY HAVING A HYDRAULIC ACTUATOR WHICH HYDRAULIC ACTUATOR HAS A TRANSMISSION

[75] Inventors: Udo Borschert, Sennfeld; Lutz Leimbach, Oberwerrn; Ullrich Scherpf, Hammelburg; Manfred Waning, Wonfurt; Michael Zottmann, Dittelbrunn, all of Germany

[73] Assignee: Fichtel & Sachs AG, Schweinfurt, Germany

[21] Appl. No.: 531,451

[22] Filed: Sep. 21, 1995

[30] Foreign Application Priority Data

Sep. 22, 1994 [DE] Germany .................. 44 33 824.4

[51] Int. Cl.[6] .................. B60K 23/02; G05G 1/21
[52] U.S. Cl. .................. 192/20; 192/84.6; 192/90; 192/91 R; 192/109 R
[58] Field of Search .................. 192/84 R, 90, 192/91 R, 91 A, 85 C, 85 CA, 20, 109 R, 84.6; 74/89.14

[56] References Cited

U.S. PATENT DOCUMENTS

| | | |
|---|---|---|
| 4,828,093 | 5/1989 | Bertin et al. |
| 4,852,419 | 8/1989 | Kittel et al. .................. 192/84 X |
| 5,010,993 | 4/1991 | Carneiro et al. .................. 192/84 R |
| 5,065,850 | 11/1991 | Bertin et al. .................. 192/90 |
| 5,135,090 | 8/1992 | Bertin et al. .................. 192/90 X |

FOREIGN PATENT DOCUMENTS

| | | |
|---|---|---|
| 3706849 | 9/1988 | Germany . |
| 4238368 | 5/1994 | Germany . |
| 2204657 | 11/1988 | United Kingdom . |
| 2246182 | 1/1992 | United Kingdom . |

*Primary Examiner*—Rodney H. Bonck
*Attorney, Agent, or Firm*—Nils H. Ljungman and Associates

[57] ABSTRACT

An actuator is provided with a drive system and a crank mechanism which converts the motion of the drive system into an essentially translational motion of an output element. The crank mechanism is designed as a worm gear pair with a worm gear which sits on the output shaft and is engaged with a segment worm gear which is rotationally mounted in a housing, whereby engaged with the segment worm gear, in addition to the output element, there is an energy storing device, preferably a spring device, mounted so that it can pivot in a bearing, which energy storing device can move relative to the segment worm gear. The spring device, in the relative position of the energy storing device with respect to the segment worm gear in which the distance between the bearing point of the energy storing device and its engagement with the segment worm gear is at a minimum, is brought closer with its end facing the segment worm gear, to within the gap width, to the outer edge of the segment worm gear, and when the worm gear is displaced around its axis of rotation, can be inserted in a recess which is located in the segment worm gear.

17 Claims, 3 Drawing Sheets

MOTOR VEHICLE CLUTCH ASSEMBLY HAVING A HYDRAULIC ACTUATOR WHICH HYDRAULIC ACTUATOR HAS A TRANSMISSION

BACKGROUND OF THE INVENTION

1. Field of the Invention

The present invention generally relates to an actuator, in particular for a motor vehicle friction clutch. The actuator includes a drive system and a crank mechanism, which crank mechanism converts the motion of the drive system into an essentially translational motion of an output element. The crank mechanism is designed as a worm gear pair with an input-side worm gear and a segment worm gear rotationally mounted in a housing. Engaged with the segment worm gear, in addition to the output element, there is an energy storing device, preferably a spring device, mounted so that it can pivot in a bearing, which energy storing device can move relative to the segment worm gear.

2. Background Information

German Patent No. 37 06 849 A1 discloses an actuator which has a drive system, the motion of which is converted into an essentially translational motion of an output element by a crank mechanism. The crank mechanism is designed as a worm gear transmission with a worm gear which sits on the output shaft and is engaged with a segment worm gear which is rotationally mounted in a housing, whereby engaged with the segment worm gear, in addition to the output element, is an energy storing device located so that it can pivot in a bearing point. The energy storing device has a spring device which is capable of movement relative to the segment worm gear. Beyond a specified top dead center position, the spring device rebounds under relaxation, whereby the rebound direction is selected so that it has at least a significant component in the direction of displacement of the application spring of the clutch, which is designed as a hydraulic master cylinder, and can be displaced from its active position by a slave cylinder (not shown). The spring device of the energy storing device thereby assists the drive system in its movement, so that the drive system can be designed to be relatively weak.

The energy storing device has a tappet rod which, by means of an eye, surrounds a bolt which is located in cheeks of the segment worm gear which are located at some distance from one another.

By means of the eye, the energy storing device thus extends into the tooth trace of the segment worm gear, but the tappet rod, in the direction of the segment worm gear, extends far enough beyond the spring device that the latter is always held, regardless of the degree of deformation of its spring, at some distance from the circumferential area of the cheeks and thus of the tooth trace of the segment worm gear. Thus, when there is a displacement movement of the segment worm gear by a predetermined angle, contact of the spring device against the edge of the segment worm gear as a result of the relaxation of the spring after a displacement of the energy storing device from the top dead center position is prevented. However, one clear disadvantage of such a realization would appear to be that, on account of the great distance of the spring device from the edge of the segment worm gear, the energy storing device must generally be very long, which means that the housing which encloses this transmission mechanism must generally be correspondingly large. Problems can result when the actuator is installed in motor vehicles, if the vehicles in question do not have sufficient space for the installation of such devices in the places provided for the purpose.

OBJECT OF THE INVENTION

The object of the present invention is to improve an actuator so that, while it includes an energy storing device, which energy storing device assists the drive mechanism and is engaged with a segment worm gear, the actuator also occupies only a minimal amount of space.

SUMMARY OF THE INVENTION

The present invention teaches that this object can be accomplished, in accordance with at least one preferred embodiment, by designing the energy storing or spring device and, in particular, the end of the spring device facing the segment worm gear, to track the movement of the segment worm gear. The segment worm gear, in the area in which the segment worm gear can pass the energy storing device during rotational movement of the segment worm gear, can preferably be provided with a recess. The angular position and radially inward dimension of the recess can be designed so that the spring device, during the displacement motion of the energy storing device, can be inserted into this recess, without the energy storing device thereby coming into contact with the segment worm gear radially inwardly or at the limits of the recess in the circumferential direction. Consequently, since the spring device can be inserted inside the tooth trace of the segment worm gear, the spring device can be brought very close to the axis of rotation of the segment worm gear. As a result, the bearing point of the energy storing device can be shifted toward the segment worm gear by the distance which corresponds to the depth of insertion in the recess. Thus, without any restriction of the function of the energy storing device, the housing, which can enclose the energy storing device, can be made shorter in the longitudinal direction of the energy storing device by the distance by which the energy storing device can be brought closer to the axis of rotation of the segment worm gear, due to the recess in the segment worm gear.

The recess can preferably be provided with limits in the circumferential direction so that the segment worm gear can essentially only be displaced by a specified angle of rotation. After the segment worm gear reaches a limit position in the direction of displacement, the segment worm gear can be returned to the starting position of the segment worm gear, by the drive system, which drive system can preferably be connected with the actuator, essentially as soon as the drive system receives an indication of the intention to change the position of the clutch, e.g. for engagement or disengagement.

Each of the above-mentioned limits of the segment worm gear can preferably correspond to a stop, which stop can limit the angular displacement of the segment worm gear. This stop can be located in a stationary manner in the housing and the stop can project into a recess of the segment worm gear. This measure can also contribute to keeping the housing of the actuator as small as possible, since inside the tooth trace of the segment worm gear, in the longitudinal area of the recess, the segment worm gear can have rotation limits on its ends, viewed in the circumferential direction. The rotation limits of the segment worm gear can interact with the stop of the present invention. In an advantageous realization of this stop, the contact between the stop and the elastomer covering of the stop can damp the drift movement of the segment worm gear.

Another embodiment of the present invention can also contribute to a compact design of the segment worm gear transmission and thus of the housing, in that, due to the one-piece design of the hub and cheeks of the segment worm gear, there can essentially be no need for additional connecting means, which additional connecting means would also take up space. In accordance with such an embodiment, the number of required components can also be significantly reduced, and can thus also reduce the number of possible sources of error.

As a result of another advantageous feature, the action of the spring device of the energy storing system can be used to fix both the energy storing device and the output element in their corresponding locations. The output element can include, for example, a hydraulic master cylinder. Thus, on one hand, when assembling the segment worm gear transmission, it is possible to employ a connection between the notch of the energy storing system (for example, an eye with a bolt) and the segment worm gear. On the other hand, it is possible to employ a connection between the segment worm gear and a notch of the output element, for example, also in the form of an eye with a bolt. As a result of such connections, the respective notch can be engaged in the respective locator under the action of the spring device of the energy storing mechanism and can be held in this position by the spring device. In this regard, however, it should be noted that the rotational mobility of the segment worm gear can be restricted, so that both the notch of the energy storing device and also the notch of the output element can essentially always be oriented so that the spring device of the energy storing device can perform its retaining function.

Although the bolt, by means of which the energy storing device can be connected to the segment worm gear, can preferably be permanently attached to the energy storing device (for example, by extrusion coating with plastic, for reasons of safety) each end of the bolt can also have a device for preventing the bolt from falling out. This device to prevent the bolt from falling out can preferably include a corresponding configuration of at least one of the cheeks for locating the bolt. It is, however, also conceivable that the bolt can be extended in the axial direction so that the bolt can almost touch the bottom of the housing, in which housing the worm gear transmission can be located. In that case, the above-mentioned bottom of the housing can act to essentially prevent the bolt from falling out.

In another preferred embodiment, as a result of the mounting of the bearing pin, which bearing pin can support the segment worm gear on one side in the housing, the segment worm gear can also be short in the axial direction of this bearing neck. Consequently, the housing in which the worm gear transmission is located can also be made essentially compact in the corresponding axial direction. In an embodiment in which the segment worm gear can be mounted so that the segment worm gear can slide on a stationary bearing neck, the segment worm gear can be made out of plastic. As a result, the friction between the inside of the hub and the bearing neck can be minimal. When the segment worm gear is made of plastic, it can also be particularly suitable if it is made in one piece, i.e. with regard to the hub and the cheeks.

In accordance with another embodiment of the present invention, the crank mechanism of the actuator can be constructed with essentially the smallest possible number of components. A particularly advantageous feature includes the design of the locator, which locator can make it possible to position the corresponding notch from radially outside to radially inside in the segment worm gear. To permit the positioning of this notch, the bearing shell can be designed so that the bearing shell can enclose the notch only over a portion of the circumference of the notch. Because the locators and a portion of the segment worm gear, which portion can surround the bearing neck, are made of elastomer material, there is essentially no abrasion of the element located by the segment worm gear if there is a relative movement between the element and the segment worm gear. The optimal solution can be a one-piece design of the segment worm gear made of elastomer material, since it is a one-piece design of the segment worm gear can permit less weight, economical manufacturing and the combination of all the transmission and bearing functions in a single component with relatively little design effort or manufacturing expense.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a hydraulically operated clutch assembly for a motor vehicle, the clutch assembly comprising: a flywheel having an axis of rotation and defining an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for hydraulically activating the clutch disc; the hydraulic activating means comprising: chamber means, the chamber means having a first end and a second end, at least a portion of the chamber means containing hydraulic fluid therein; means for being acted upon by the hydraulic fluid; the means for being acted upon by the hydraulic fluid being disposed in the chamber means; means for operatively connecting the pressure plate to the means for being acted upon by the hydraulic fluid; means for providing hydraulic fluid into and out of the chamber means to activate the pressure plate; means for actuating the hydraulic activating means; the actuating means comprising: a housing; a mechanical drive mechanism for converting a first geometric movement into a second geometric movement; means for driving the mechanical drive mechanism; the driving means being connected to the mechanical drive mechanism; means for providing signals to the mechanical drive mechanism; means for connecting the means for providing signals with the mechanical drive mechanism; the signals for operating the mechanical drive mechanism; cylinder means for providing hydraulic fluid under pressure to the means for providing hydraulic fluid into and out of the chamber means; the mechanical drive mechanism being connected to the cylinder means to provide flow of hydraulic fluid into and out of the chamber means; the mechanical drive mechanism comprising: worm gear means; the worm gear means comprising a worm gear; the worm gear means further comprising worm gear wheel means; the worm gear wheel means being in mesh with the worm gear; the worm gear wheel means being connected within the housing; the worm gear wheel means being movable in a first direction and a second direction; the worm gear wheel means having an outer circumferential portion; at least a portion of the worm gear wheel means comprising a cut out portion; a coil spring structure; the coil spring structure being disposed within the housing; the coil spring structure being disposed adjacent the worm gear wheel means; the coil spring structure having a first end and a second end; the first end of the coil spring structure comprising pivot means; the housing comprising mating pivot means for receiving the pivot means of the coil spring structure; the pivot means of the coil spring structure together with the mating pivot means of the housing to permit the coil spring structure to pivot with respect to the worm gear wheel means; the second end of the coil spring structure being disposed opposite the first end; the second end of the coil spring structure being disposed adjacent a portion of the worm gear wheel means; the worm gear wheel means being movable in the first direction to dispose the second end of the coil spring structure in contact with the outer circumferential portion of the worm gear wheel means; and the worm gear wheel means being movable in the second direction to dispose a portion of the coil spring structure within the cut out portion of the worm gear wheel means.

Another aspect of the present invention resides broadly in an actuator for actuating a hydraulic activating system, such as an actuator for operating a hydraulically operated clutch assembly for a motor vehicle, which clutch assembly comprises: a flywheel having an axis of rotation and defining an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; the hydraulic activating system comprising: chamber means, the chamber means having a first end and a second end, at least a portion of the chamber means containing hydraulic fluid therein; means for being acted upon by the hydraulic fluid; the means for being acted upon by the hydraulic fluid being disposed in the chamber means; means for operatively connecting the pressure plate to the means for being acted upon by the hydraulic fluid; means for providing hydraulic fluid into and out of the chamber means to activate the pressure plate; the actuator for actuating the hydraulic activating system comprising: a housing; a mechanical drive mechanism for converting a first geometric movement into a second geometric movement; means for driving the mechanical drive mechanism; the driving means being connected to the mechanical drive mechanism; means for providing signals to the mechanical drive mechanism; means for connecting the means for providing signals with the mechanical drive mechanism; the signals for operating the mechanical drive mechanism; cylinder means for providing hydraulic fluid under pressure to the means for providing hydraulic fluid into and out of the chamber means; the mechanical drive mechanism being connected to the cylinder means to provide flow of hydraulic fluid into and out of the chamber means; the mechanical drive mechanism comprising: worm gear means; the worm gear means comprising a worm gear; the worm gear means further comprising worm gear wheel means; the worm gear wheel means being in mesh with the worm gear; the worm gear wheel means being connected within the housing; the worm gear wheel means being movable in a first direction and a second direction; the worm gear wheel means having an outer circumferential portion; at least a portion of the worm gear wheel means comprising a cut out portion; a coil spring structure; the coil spring structure being disposed within the housing; the coil spring structure being disposed adjacent the worm gear wheel means; the coil spring structure having a first end and a second end; the first end of the coil spring structure comprising pivot means; the housing comprising mating pivot means for receiving the pivot means of the coil spring structure; the pivot means of the coil spring structure together with the mating pivot means of the housing to permit the coil spring structure to pivot with respect to the worm gear wheel means; the second end of the coil spring structure being disposed opposite the first end; the second end of the coil spring structure being disposed adjacent a portion of the worm gear wheel means; the worm gear wheel means being movable in the first direction to dispose the second end of the coil spring structure in contact with the outer circumferential portion of the worm gear wheel means; and the worm gear wheel means being movable in the second direction to dispose a portion of the coil spring structure within the cut out portion of the worm gear means.

Yet another aspect of the present invention resides broadly in a hydraulically operated clutch assembly for a motor vehicle, the clutch assembly comprising: a flywheel having an axis of rotation and defining an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for hydraulically activating the clutch disc; the hydraulic activating means comprising: chamber means, the chamber means having a first end and a second end, at least a portion of the chamber means containing hydraulic fluid therein; means for being acted upon by the hydraulic fluid; the means for being acted upon by the hydraulic fluid being disposed in the chamber means; means for operatively connecting the pressure plate to the means for being acted upon by the hydraulic fluid; means for providing hydraulic fluid into and out of the chamber means to activate the pressure plate; means for actuating the hydraulic activating means; the actuating means comprising: a housing; a mechanical drive mechanism for converting a first geometric movement into a second geometric movement; means for driving the mechanical drive mechanism; the driving means being connected to the mechanical drive mechanism; means for providing signals to the mechanical drive mechanism; the signals for operating the mechanical drive mechanism; cylinder means for providing hydraulic fluid under pressure to the means for providing hydraulic fluid into and out of the chamber means; the mechanical drive mechanism being connected to the cylinder means to provide flow of hydraulic fluid into and out of the chamber means; the mechanical drive mechanism comprising: worm gear means; the worm gear means comprising a worm gear; the worm gear means further comprising worm gear wheel means; the worm gear wheel means being in mesh with the worm gear; the worm gear wheel means being connected within the housing; the worm gear wheel means for being moved in a first direction and a second direction; the worm gear wheel means having an outer circumferential portion; the worm gear wheel means comprising at least one notch; at least one member for being engaged within the at least one notch; the at least one notch having an inner circumferential portion; the at least one member, engaged within the at least one notch, having an outer circumference; a portion of the outer circumference of the at least one member engaged within the at least one notch being in contact with a portion of the inner circumferential portion of the at least one notch; the inner circumferential portion of the at least one notch being insufficient by itself to hold the at least one member within the at least one notch; means for retaining the at least one member within the at least one notch of the worm gear wheel means; and the means for retaining the at least one member within the at least one notch being disposed within the housing.

BRIEF DESCRIPTION OF THE DRAWINGS

The present invention is explained in greater detail below with reference to the accompanying drawings, in which.

DESCRIPTION OF THE PREFERRED EMBODIMENT

Figure 1:
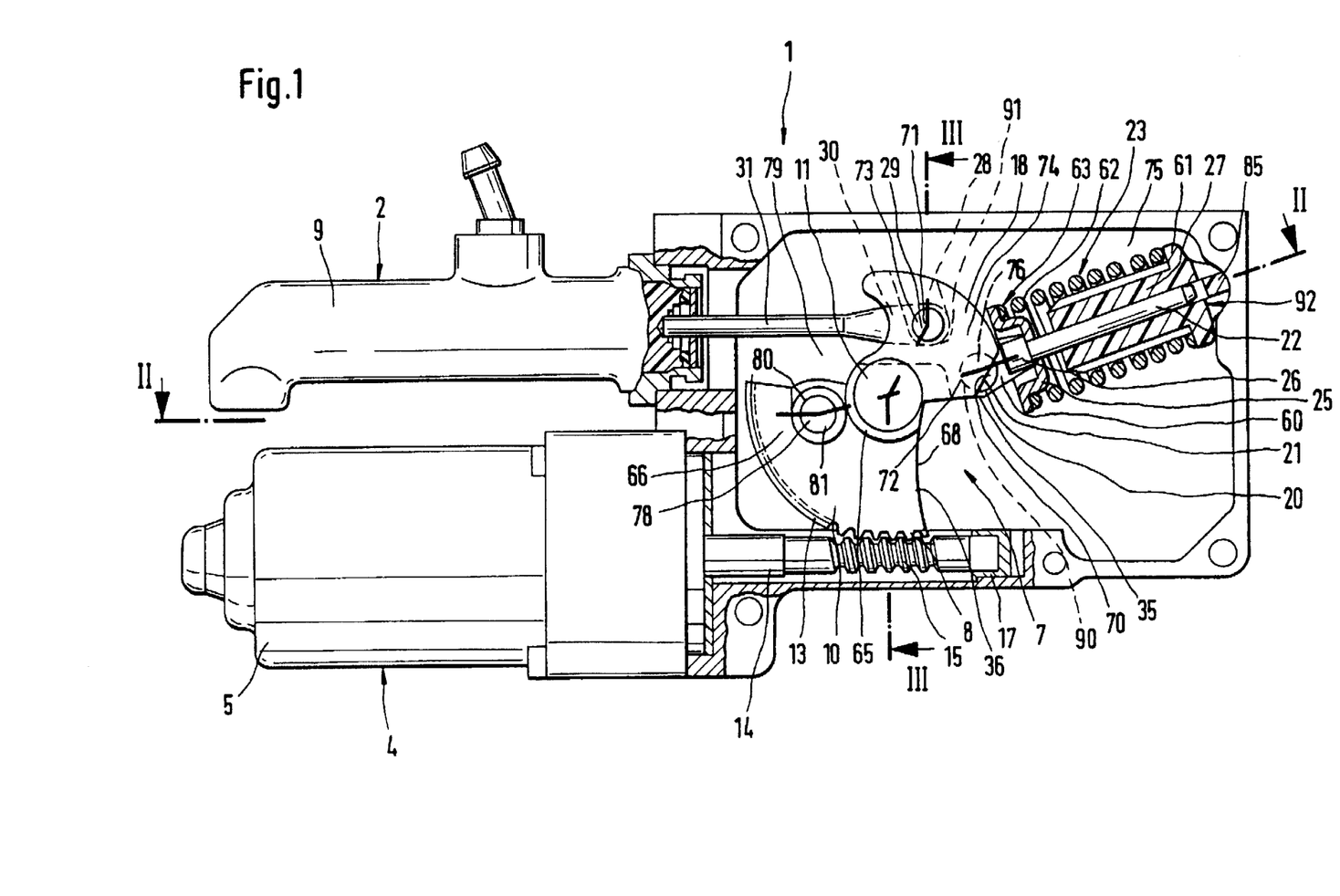
FIG. 1 shows an overhead view in partial cross section of an electric motor actuator for a motor vehicle friction clutch.
Figure 2:
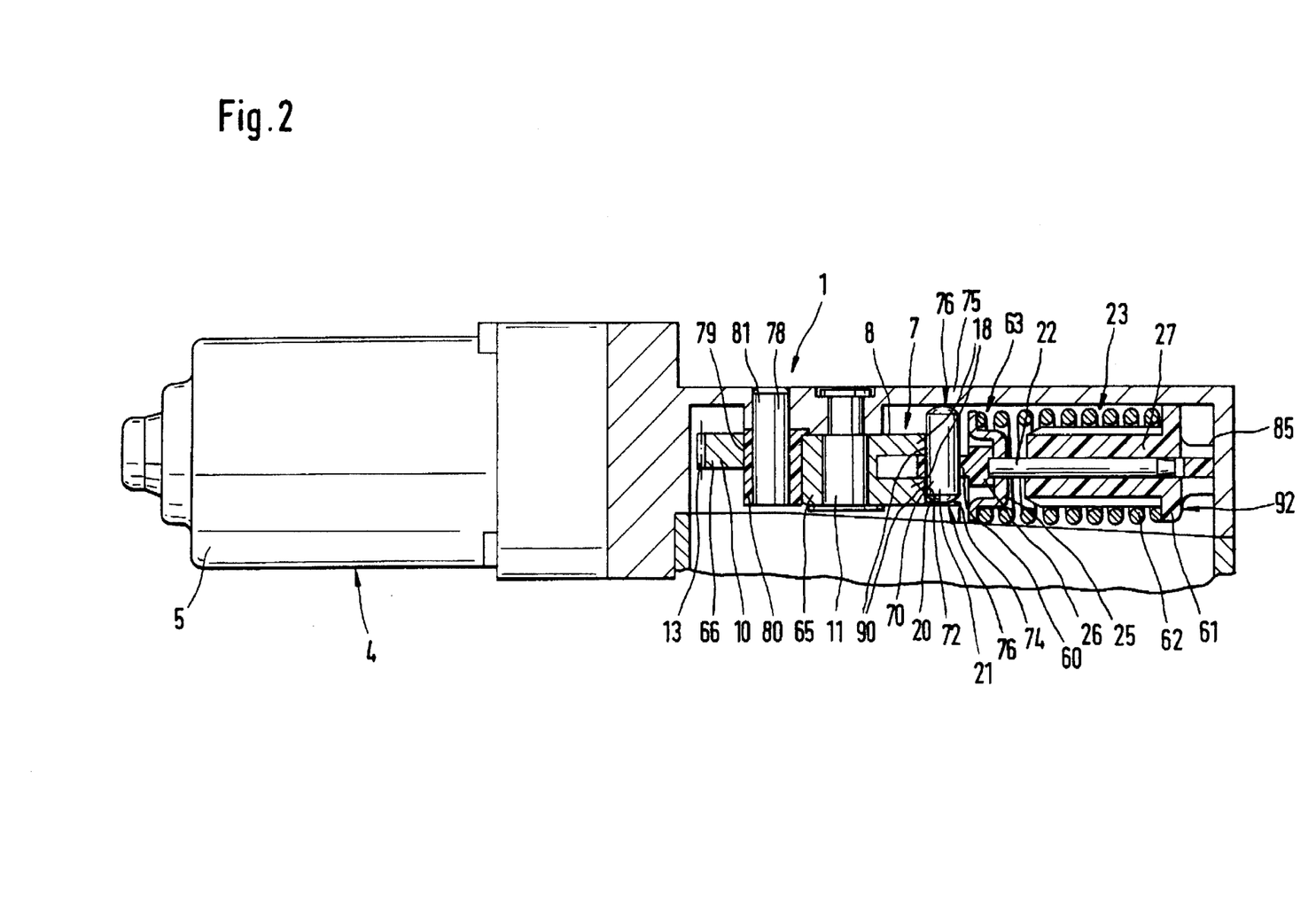
FIG. 2 shows the actuator as shown in FIG. 1 along Line II—II.
Figure 3:
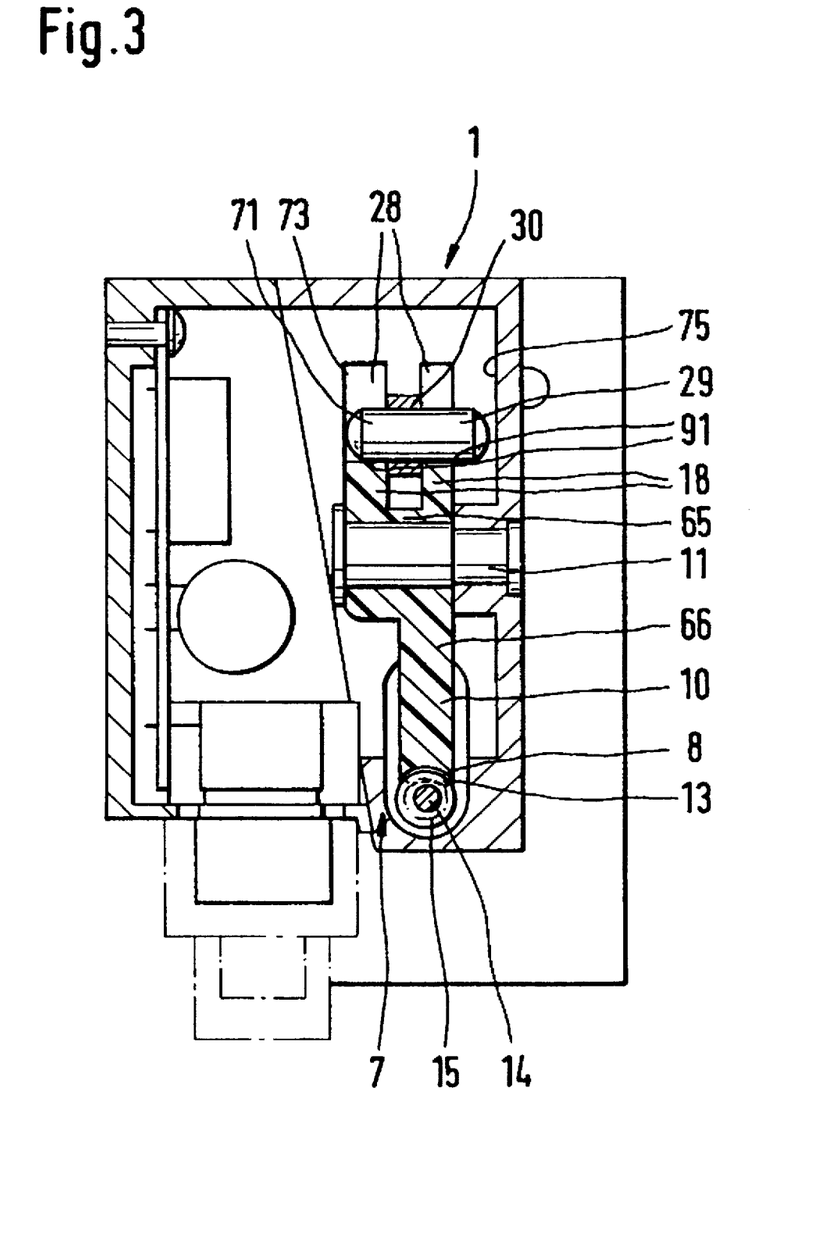
FIG. 3 shows a cross section through the actuator, viewed along Line III—III in FIG. 1.

FIGS. 1 to 3 illustrate an actuator for a motor vehicle friction clutch, which friction clutch, in the illustrated embodiment, can have a hydraulic clutch disengagement system. The actuator includes a housing 1 with a drive system 4 in the form of an electric motor 5. The electric motor 5 can actuate an output element 2 formed by a hydraulic master cylinder 9 of the hydraulic clutch disengagement system by means of a transmission 7. The transmission 7 can preferably be designed as a crank mechanism.

The crank mechanism or transmission 7 can act as a worm gear pair 8, which worm gear pair 8 can have a segment worm gear 10. The segment worm gear 10 can be rotationally mounted on a bearing neck 11, which bearing neck 11 can be fastened by its one end in the housing part 1. A worm gear 15 can sit directly on an output shaft 14 of the drive system 4, which worm gear 15 can be engaged with a worm gear thread 13 on the circumference of the segment worm gear 10. The drive shaft 14 can be mounted, with its free end, in the housing part 1 by means of a sleeve 17. On the segment worm gear 10 there can preferably be cheeks 18, which cheeks 18, viewed in the axial direction of the bearing neck 11, can be located at some distance from one another. In the cheeks 18, there can be first recesses 20, which first recesses 20 can preferably be aligned with one another. There can be a bolt 21 located within the recesses 20, which bolt 21 can run parallel to the bearing neck 11. The bolt 21 can be inserted and fastened in an eye 60 of a tappet rod 22, whereby the eye 60 is preferably made of plastic and the eye 60 can be permanently connected to the bolt 21 by extrusion coating of the bolt 21. The tappet rod 22 can be located so that it can be displaced in a plastic bushing 27.

The plastic bushing 27 can be mounted with its end farther from the bolt 21 so that the plastic bushing 27 can pivot in a bearing 85 in the housing 1. The plastic bushing 27 can have a seat 61 for a spring 62, which spring 62 can be supported with its end facing the segment worm gear 10 on a spring plate 25. The spring plate 25 can come into contact, by means of its side farther from the spring 62, with a radially expanded shoulder 26 of the tappet rod 22.

An energy storing device 23 can be formed by the plastic bushing 27, together with the tappet rod 22 (surrounding the bolt 21), along with the spring 62, and the spring plate 25. The bearing point 85 of the energy storing device 23 on the housing 1 can be located relative to the center axis of the bearing neck 11. Thus, the energy storing device 23, in its limit position as shown in FIG. 1, can assume a position slightly past top dead center opposite to the disengagement direction of rotation of the segment worm gear 10. Such a position past top dead center to stabilize the limit position is described in detail in German Patent No. 37 06 849 A1.

The segment worm gear 10, which segment worm gear 10 can preferably include the hub 65, a carrier 66 for the gear teeth 13 and the cheeks 18, can preferably be made in one piece out of plastic. The segment worm gear 10 can have, with reference to the longitudinal axis of the bearing neck 11 in FIG. 1, a recess 68 in the counterclockwise direction inside the tooth trace of the segment worm gear 10. The recess 68, viewed in the circumferential direction, can be formed between limits 35 and 36 of the segment worm gear 10. This recess 68, as explained in greater detail below, can act, when the segment worm gear 10 is driven in the direction of rotation, illustrated in FIG. 1, in the clockwise direction to insert the spring device 63.

In summary, in accordance with an embodiment of the present invention, the segment worm gear 10 preferably includes the hub 65, a carrier 66 for the gear teeth 13, and the cheeks 18. The segment worm gear 10, along with the hub 65, the carrier 66, and the cheeks 18 are preferably made in one piece out of plastic. The cheeks 18 preferably include solid portions, which solid portions extend outward and rotate around the hub 65 of the segment worm gear 10. With reference to the longitudinal axis of the bearing neck 11, as illustrated in FIG. 1, the segment worm gear 10 can preferably have a recess 68, which recess 68 can be located to the right of the gear teeth 13 of the segment worm gear 10, with respect to FIG. 1. The recess 68 can be located in a portion of the circumference of the segment worm gear 10 between the limits 35 and 36. When the segment worm gear 10 is rotated essentially in the counterclockwise direction, with respect to FIG. 1, the recess 68 can provide a space in which the spring device 63 can be inserted. The end of the spring device 63 facing the recess 68 can thereby be in contact with limit 35 of the segment worm gear 10. As a result, the spring device 63 can exert an additional force on the segment worm gear 10 thereby providing an essentially quick rotation of the segment worm gear 10.

At an angular offset with respect to the center axis of the bearing neck 11, there can be additional recesses 28 (as shown in FIG. 3) in the cheeks 18 of the segment worm gear 10, which additional recesses 28 can preferably be aligned with one another. These additional recesses 28 can be provided to hold a bolt 29, which bolt 29 can be surrounded by an eye 30 of the piston rod 31 of the hydraulic master cylinder 9. The additional recesses 28 can be oriented toward the energy storing device 23, so that the bolt 29, once it has been introduced from radially outside into the recesses 28, can be held by the action of the energy storing device 23 on the radially inner end of the recesses 28. The angle of rotation of the segment worm gear 10 can thereby be limited so that this advantageous action of the energy storing device 23 can be preserved under essentially all conditions.

In summary, in accordance with an embodiment of the present invention, due to the spring action of the energy storing device 23, the bolt 29 can be essentially force fit radially within the recesses 28 of the plastic material of the segment worm gear 10. For this purpose, the angle of rotation of the segment worm gear 10 is preferably limited, thus permitting the frictional spring action of the energy storing device 23 to essentially always be exerted on the bolt 29 within the recesses 28.

The eye 60, of the energy storing device 23, can surround the bolt 21. The eye 60 can form a first notch 70 on the segment worm gear 10. The eye 30, which eye 30 can surround the bolt 29, can form a second notch 71. The first notch 70 can extend into a bearing shell 90 of the recesses 20, which recesses 20 act as a locator 72 while the notch 71 can be engaged in a bearing shell 91 of the locator 73 formed by the recesses 28. The bearing shells 90 and 91 can surround the bolts 21 and 29, respectively, over only a portion of the diameter of the bolts 21 and 29. Thus, it can be possible, as explained in greater detail below, to engage the notches 70, 71 in the locators 72, 73, respectively, from radially outside to radially inside. In the vicinity of the respective locator 72, 73, the upper cheek 18, illustrated in FIG. 1, can have a cover plate 74. By means of the cover plate 74, should the bolts 21 and 29 unintentionally come loose from the corresponding eyes 60 and 30, the bolts 21 and 29 can be prevented from falling out. On the opposite side of the bolts 21 and 29, the bolts 21 and 29 can preferably extend, to within the gap width, toward the base 75 of the housing 1, so that here, the bolts 21 and 29 can be protected from falling out of the corresponding eyes 60, 30. The cover plate 74 of the upper cheek 18, thus, like the base 75 of the housing 1, can act as a device 76 to essentially prevent the bolts 21 and 29 from falling out.

In accordance with an embodiment of the present invention, therefore, the bolts 21 and 29 can preferably have a long enough dimension such that one end of the bolts 21 and 29 can extend toward, and are in contact with, the cover plate 75 of the upper part of the cheeks 18, while the other end of the bolts 21 and 29 can extend toward, and are in contact with, the base 75 of the housing 1. The cover plate 74 together with the base 75 can thereby surround and securely hold the respective ends of the bolts 21 and 29 in place with respect to the segment worm gear 10.

In the base 75 of the housing 1, a bolt 78 can be fastened. The bolt 78 can be provided, at least in the longitudinal area of a recess 79 in the segment worm gear 10, with an elastic covering 80. This bolt 78 can act as a stop 81 for the ends of the recess 79 which lie inside the tooth trace of the segment worm gear 10, viewed in the circumferential direction.

In summary, in accordance with an embodiment of the present invention, the bolt 78 can act as the stop 81 for the segment worm gear 10 as the segment worm gear 10 rotates in a clockwise or counterclockwise direction with respect to FIG. 1.

The transmission can function as follows, in accordance with at least one embodiment of the present invention:

A motion imparted by the drive system 4 can cause a rotation of the output shaft 14, so that a worm gear 15 located on the drive shaft 14, and thus the segment worm gear 10, can be placed in rotational motion. As a function of the direction of the drive 4, the piston rod 31 of the hydraulic master cylinder 9 can be moved inward or outward. The energy storing device 23 can thereby act as follows:

In the limit position of the segment worm gear 10 corresponding to the engaged position of the clutch, as illustrated in FIG. 1, the spring 62 is essentially taut. If the drive system 4 propels the segment worm gear 10 in the clutch disengagement direction, i.e. counterclockwise, with respect to FIG. 1, the spring 62 is essentially relaxed after the spring 62 passes through its top dead center position. Thus, the spring 62 can assist the drive 4. In this manner, the clutch can be disengaged quickly, even when the drive mechanism is comparatively weak. In the engagement direction, the drive system 4, the direction of rotation of which has been reversed, i.e. clockwise with respect to FIG. 1, can be assisted by the clutch application spring, so that in spite of the comparatively low power of the drive system, tension can once again be applied to the spring 62.

In summary, in accordance with an embodiment of the present invention, the power of the drive 4 can permit rotation of the drive shaft 14 in one direction, or, alternatively, in another direction. The threads of the worm gear 15 of the drive shaft 14 can thereby come into contact with the worm gear threads 13 of the segment worm gear 10. As a result, the segment worm gear 10 can rotate in a direction corresponding to the direction of rotation of the drive shaft 14. The piston rod 31 can preferably be fastened to the segment worm gear 10, thereby permitting the piston rod 31 to move in a longitudinal direction with respect to the transmission 7. The piston rod 31 can thereby move inward or outward with respect to the hydraulic master cylinder 9. When the clutch is in the engaged position, the segment worm gear 10 is essentially in its limit position, as shown in FIG. 1. In the limit position of the segment worm gear 10, the energy storing device 23 can preferably be taut with the tension applied thereto. When the drive 4 rotates the segment worm gear 10 in the opposite direction, i.e. counterclockwise with respect to FIG. 1, the clutch can become disengaged. As the clutch begins to disengage, the energy storing device 23 can become relaxed, thus essentially assisting in the quick disengagement of the clutch.

While the energy storing device 23 can assist the drive motion of the drive system 4, the energy storing device 23 can follow the rotational movement of the segment worm gear 10 by means of a pivoting movement around the bearing point 85 in the housing 1. Thereby the spring device 63 and, in particular, the spring plate 25 and the end of the spring 62 facing the spring plate 25, can thereby pivot into the recess 68 of the segment worm gear 10, due to the change in the angle of rotation with respect to the segment worm gear 10. The recess 68 can thereby be designed so that the spring device 63 can penetrate inside the tooth trace of the segment worm gear 10, without the spring plate 25 or the spring 62 essentially coming in contact with the corresponding limit 35, 36 of the recess 68.

As a result of this feature, the spring plate 25 and thus the entire energy storing system 23 can be installed so close to the segment worm gear 10 that when the energy storing system 23 passes through the top dead center position, in which the spring 62 is compressed to the maximum, the spring plate 25 can be moved close to the circumferential area of the segment worm gear 10, to within the gap width. The housing 1 can thus be kept very compact in the direction of the longitudinal axis of the energy storing system 23. When the spring 62 essentially relaxes during a pivoting movement of the segment worm gear 10, the spring plate 25 can be pushed toward the bearing neck 11. The spring plate 25 can thus penetrate into the recess 68.

Also for reasons of space, the stop 81 can be engaged in the recess 79. The recess 79, like the recess 68, can preferably be located inside the tooth trace of the segment worm gear 10. The recess 79, seen in the circumferential direction, can preferably be adapted to the size of the pivoting angle of the segment worm gear 10, so that when the predetermined angle is exceeded, the segment worm gear 10 can essentially always be in contact with one end of the recess 79 against the stop 81. The same can be true for a motion in the opposite direction.

In summary, in accordance with an embodiment of the present invention, the stop 81 can preferably be located within the space defined by the recess 79, thereby also permitting a compact design of the housing 1, in the longitudinal direction. The recess 79 can preferably be designed to essentially surround the angle of rotation of the segment worm gear 10. The stop 81, however, can preferably be located at a point within the outer circumference of the segment worm gear 10. As a result, the segment worm gear 10 can rotate, i.e. in a clockwise or counterclockwise direction with respect to FIG. 1, whereby a circumferential portion of the segment worm gear 10 can come into contact with the corresponding side of the stop 81, which stop 81 can thereby prevent the segment worm gear 10 from exceeding the predetermined angle of rotation.

As a result of the one-piece design of the segment worm gear 10, with regard to its carrier 66 for the gear teeth 13, its hub 65 and its cheeks 18, large connecting means which take up a great deal of space are essentially unnecessary. Also as a result of this one-piece design, the installation space made available by the housing 1 can be kept relatively small. The size of the housing 1 can be further reduced by the feature whereby the bearing neck 11, which bearing neck 11 can hold the segment worm gear 10, can be fastened to the housing 1 on only one side of the housing 1.

Since the segment worm gear 10 can be rotationally mounted on this bearing neck 11, the segment worm gear 10 can preferably be made of plastic, to prevent any unnecessary abrasion between the inside of the hub 65, of the segment worm gear 10, and the bearing neck 11. Precisely as a result of the manufacture of the segment worm gear 10 out of plastic, it becomes essentially possible to reduce the size of the transmission 7 to a minimum.

As a result of the one-piece design of the segment worm gear 10, the number of components can be significantly reduced with respect to a multi-part design, e.g. like the one disclosed in DE 37 06 849 A1, so that the manufacturing process can be very simple. This simplification can also be promoted by the fact that the notches 70 and 71, of the energy storing system 23, and the piston rod 31, of the master cylinder 9, respectively, can be engaged in a very simple manner in the corresponding locators 72, 73, as follows:

When the energy storing system 23 is essentially not yet active, the segment worm gear 10 can be pivoted in the counterclockwise direction until the piston rod 31 of the master cylinder 9 can be inserted in a straight line with its bolt 29 in the eye 30 into the recesses 28 of the cheeks 18. Then the segment worm gear 10 can be pivoted clockwise, driving the piston rod 31, until the recesses 20 in the cheeks 18 are essentially aligned with the longitudinal axis of the tappet rod 22 of the energy storing system 23. When the spring 62 relaxes, the bolt 21, held on the free end of the tappet rod 22 by means of the eye 60, can be pushed into the corresponding recesses 20 in the cheeks 18 of the segment worm gear 10. Under the action of the now partly relaxed spring 62, the bolt 21 can be held in contact with the radially inside end of the recesses 20. In this position of the segment worm gear 10, the other locator 73 can point toward the energy storing system 23, so that the locator 73 can have a component against the direction of action of the spring 62.

The energy storing system 23 can also provide for contact of the bolt 29 with the radially inner end of the recesses 28 in the cheeks 18 of the segment worm gear 10. The energy storing system 23 can therefore be active as a retaining element 92 for the notches 70, 71 on the bearing shells 90, 91 of the locators 72, 73. Thus the assembly regarding these components is essentially already complete.

In summary, in accordance with an embodiment of the present invention, an essentially simplified manufacture of the segment worm gear 10 can include the connection of the piston rod 31 and the energy storing device to the segment worm gear 10. Before the energy storing device 23 is connected to the segment worm gear 10, the piston rod 31 can preferably be connected to the segment worm gear 10. By rotating the segment worm gear 10 in the counterclockwise direction, with respect to FIG. 1, the recesses 28 can extend in a radial direction with respect to the piston rod 31. As a result, the bolt 29 can be inserted into the eye 30 of the piston rod 31, then the bolt 29 can be inserted from radially outside to radially within the recesses 28. Thereafter, the energy storing system 23 can be connected to the segment worm gear 10. Thus, the segment worm gear 10 is then rotated in the clockwise direction, with respect to FIG. 1, such that the recesses 20 can be in alignment with the tappet rod 22 of the energy storing system 23. The bolt 21 can then be inserted into the eye 60 of the tappet rod 22 whereby the action of the spring 62 of the energy storing system 23 can push the bolt 21 radially within the recesses 20.

During the subsequent operation of the segment worm gear 10, the stop 81, among other components, can essentially guarantee that the angle of rotation of the segment worm gear 10 can be limited so that neither the notch 70 nor the notch 71 can move out of the locators 72 or 73, respectively.

One feature of the invention resides broadly in the actuator, in particular for a motor vehicle friction clutch, with a drive system and a crank mechanism which converts the motion of the drive system into an essentially translational motion of an output element, whereby the crank mechanism is designed as a worm gear pair with an input-side worm gear and a segment worm gear which is rotationally mounted in a housing, whereby engaged with the segment worm gear, in addition to the output element, there is an energy storing device, preferably a spring device, mounted so that it can pivot in a bearing, which energy storing device can move relative to the segment worm gear, characterized by the fact that the spring device 63, in the relative position of the energy storing device 23 with respect to the segment worm gear 10 in which the distance between the bearing point 85 of the energy storing device 23 and its engagement 70 with the segment worm gear 10 is at a minimum, is brought closer with its end facing the segment worm gear 10, to within the gap width, to the outer edge of the segment worm gear 10, and when the worm gear is displaced around its axis of rotation, the spring device can be inserted in a recess 68 which is located in the segment worm gear 10 inside its tooth trace.

Another feature of the invention resides broadly in the actuator with a segment worm gear which can be displaced for a predetermined angle of rotation, characterized by the fact that in the circumferential direction, the recess 68 is sized so that contact between the end of the spring device 63 facing the segment worm gear 10 and the limit 35, 36 on the segment gear wheel corresponding to the direction of displacement can be prevented.

Yet another feature of the invention resides broadly in the actuator with at least one stop which limits the angle of displacement of the segment worm gear, whereby the stop is located in a stationary manner in the housing and projects into a recess of the segment worm gear which is located radially inside its tooth trace and is sized in the circumferential direction so that its ends define the maximum angle of displacement of the segment worm gear, characterized by the fact that the stop 81 is formed by a pivot 78 which is at least partly realized with an elastomer covering 80.

Still another feature of the invention resides broadly in the actuator with a segment worm gear which has a hub surrounding the axis of rotation and two cheeks preferably running parallel to one another and at some distance from one another which are used to locate the notch of the energy storing device or of the output element, characterized by the fact that the hub 65 is designed in one piece with the cheeks 18.

A further feature of the invention resides broadly in the actuator characterized by the fact that the cheeks 18 have locators 72, 73 both for the notch 70 of the energy storing device 23 and for the notch 71 of the output element 2, whereby the longitudinal direction of the locators 72, 73 is selected so that they have a component opposite to the direction of action of the energy storing device 23.

Another feature of the invention resides broadly in the actuator characterized by the fact that the notches 70, 71 of the energy storing device 23 and of the output element 8 are each surrounded by an eye 60, 30 respectively on the free end of a rod tappet rod 22, piston rod 31, in which bolts 21, 29 are engaged in the corresponding locators 72, 73.

Yet another feature of the invention resides broadly in the actuator characterized by the fact that at least the eye 60 on the free end of the tappet rod 22 of the energy storing device 23 holds the bolt 21 immovably in position.

Still another feature of the invention resides broadly in the actuator characterized by the fact that the non-detachable connection between the eye 60, 30 and the bolt 21, 29 can be formed by extrusion-coating the latter, preferably with plastic.

A further feature of the invention resides broadly in the actuator characterized by the fact that there is a device 76 which keeps the bolt captive corresponding to each end of the bolt 21, 29.

Another feature of the invention resides broadly in the actuator characterized by the fact that at least one of the cheeks 18 has a cover plate 74 which is adjacent to the corresponding end of the bolt 21, 29 as a device 76 to keep the bolt captive.

Yet another feature of the invention resides broadly in the actuator characterized by the fact that the part of the bottom 75 of the housing 1 which lies in the area of movement of the bolt 21, 29 acts during displacement of the segment worm gear 10 as the device 76 to keep the bolt 21, 29 captive.

Still another feature of the invention resides broadly in the actuator characterized by the fact that the segment worm gear 10 is mounted rotationally on a bearing neck 11, only one end of which is fastened in the housing 1.

A further feature of the invention resides broadly in the actuator characterized by the fact that the segment worm gear 10 is made of plastic.

Another feature of the invention resides broadly in the actuator, in particular for a motor vehicle friction clutch, with a drive system and a crank mechanism which converts the motion of the drive system into an essentially translational motion of an output element, whereby the crank mechanism is designed as a worm gear pair with an input-side worm and a segment worm gear which is rotationally mounted in a housing, which segment worm gear has a locator at least for the output element, characterized by the fact that the locator 72, 73 acts as a bearing point for a notch 70, 71, which after being inserted from radially outside to radially inside into the locator 72, 73, can be brought into contact against a bearing shell 90, 91 which encloses the locator over only a portion of its circumference, and can be secured by a retaining element 92 against falling out of the bearing shell 90, 91.

Yet another feature of the invention resides broadly in the actuator characterized by the fact that at least the locator 72, 73 of the segment worm gear 10 consists of elastomer material.

Still another feature of the invention resides broadly in the actuator characterized by the fact that the hub 65 of the segment worm gear 10 consists of elastomer material, and surrounds a bearing neck 11 which is fastened only on one end in the housing 1.

A further feature of the invention resides broadly in the actuator characterized by the fact that the segment worm gear 10 is made in one piece of elastomer material.

Another feature of the invention resides broadly in the actuator characterized by the fact that the retaining element 92 is formed by an energy storing device 23 which acts on the segment worm gear 10.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Some examples of electronic components which may be utilized in accordance with the present invention may be found in the following U.S. Patents: U.S. Pat. No. 5,325,082 entitled "Comprehensive Vehicle Information Storage System"; U.S. Pat. No. 5,199,325 entitled "Electronic Shift or Clutch Actuator for a Vehicle Transmission" to Dana Corporation; and U.S. Pat. No. 5,303,807 entitled "Electrohydraulic Device for Controlling the Engagement of the Clutch in Motor Vehicles and the Like" to Fadiel.

Some examples of thermal conductors which may be utilized in accordance with the present invention may be found in the following U.S. Patents: U.S. Pat. No. 5,199,165 entitled "Heat Pipe-electrical Interconnect Integration Method for Chip Modules" to Hewlett-Packard; U.S. Pat. No. 5,243,218 entitled "Cooling Structure for Electronics Devices" to Fujitsu; U.S. Pat. No. 5,296,310 entitled "High Conductivity Hybrid Material for Thermal Management" to Materials Science Corporation; and U.S. Pat. No. 5,345,107 entitled "Cooling Apparatus for Electronic Device" to Hitachi.

Some examples of seals for electronics components which may be utilized in accordance with the present invention may be found in the following U.S. Patents: U.S. Pat. No. 5,278,357 entitled "Electric Wire Holding Case Preventing Oil Leak" to Yazaki; U.S. Pat. No. 5,326,589 entitled "Method of Protecting Electronic or Electric Part" to Shin-Etsu; U.S. Pat. No. 5,243,131 entitled "Housing for an Electronic Circuit" to Bosch; and U.S. Pat. No. 5,282,114 entitled "Ruggedized Computer Assembly Providing Accessibility and Adaptability to, and Effective Cooling of, Electronic Components" to Codar.

Some examples of motor current sensors which may be utilized in accordance with the present invention may be found in the following U.S. Patents: U.S. Pat. No. 5,254,926 entitled "Current-mode Hysteresis Control for Controlling a Motor" to Ford; U.S. Pat. No. 5,281,900 entitled "DC Motor Controller" to Hyundai; U.S. Pat. No. 5,304,912 entitled "Control Apparatus for Induction Motor" to Hitachi; U.S. Pat. No. 5,313,151 entitled "Induction Type Electric Motor Drive Actuator System" to Rotork; and U.S. Pat. No. 5,350,988 entitled "Digital Motor Controller" to Allied Signal, Inc.

Some examples of devices for testing electronic components which may be utilized in accordance with the present invention may be found in the following U.S. Patents: U.S. Pat. No. 5,289,117 entitled "Testing of Integrated Circuit Devices on Loaded Printed Circuit" to Everett Charles; U.S. Pat. No. 5,307,290 entitled "System for the Automatic Testing, Preferably on a Bench, of Electronic Control Systems Which are Intended to be Fitted in Vehicles" to Fiat; and U.S. Pat. No. 5,315,252 entitled "Automotive Test System with Input Protection" to SPX Corporation.

Some examples of optical and other systems which may be utilized with or in the present invention may be found in the following U.S. Patents:

U.S. Pat. No. : 5,280,981, Inventor: Gordon R. Schulz, Title: End effector with load-sensitive digit actuation mechanisms; U.S. Pat. No. : 5,250,888, Inventor: Hang du Yu, Title: Apparatus for and process of rotating a display; U.S. Pat. No. : 5,191,284, Inventors: Roberto Moretti and Angelo Varvello, Title: Device for detecting the relative rotational speed of two elements in a vehicle wheel; U.S. Pat. No. : 5,239,263, Inventors: Hitoshi Iwata, Katsuhiro Minami, Hisahiro Ando, Hisashi Hirose and Shigeru Iguchi, Title: Magnetic rotation sensor for rotary shaft; U.S. Pat. No. : 5,252,919, Inventor: Saburo Uemura, Title: Apparatus producing trapezoidal waveforms from a pair of magnetic sensors for detecting the rotating angle of an object; U.S. Pat. No. : 5,291,319, Inventor: Ellis D. Harris, Title: Rotating disc optical synchronization system using binary diffractive optical elements; U.S. Pat. No. : 5,307,549, Inventors: Seisuke Tsutsumi and Nobuyuki Ito, Title: Apparatus and method for synchronized control of machine tools; U.S. Pat. No. : 5,309,094, Inventors: Christian Rigaux and Pascal Lhote, Title: Bearing rotary speed sensor with concentric multipole magnetic rings axially aligned with collector branches; U.S. Pat. No. : 5,192,877, Inventors: Jean Bittebierre and Philippe Biton, Title: Hall Effect Sensor and component providing differential detection; Inventors: Shigemi Murata and Masayuki Ikeuchi, Title: Angle detecting device having improved mounting arrangement for mounting Hall-effect sensor.

Some examples of control devices and other systems which might be used with or in the present invention are:

U.S. Pat. No. : 4,852,419, Inventors: Friedrich Kittel, Dieter Lutz, Franz Nagler, Horst Oppitz and Gerhard Gasper, Title: Control device, in particular for a motor-vehicle friction clutch; U.S. Pat. No. : 5,212,380, Inventors: Seiichi Sato, Kazuo Yamaguchi, Yoshi Kurosawa, Atsushi Ueda and Masami Matsumura, Title: Automotive engine control system with rotary encoder indexing; U.S. Pat. No. : 5,326,160, Inventors: John P. Bayliss and Sean Byrnes, Title: Hydraulic systems for vehicles; U.S. Pat. No. : 5,307,013, Inventors: Alfred J. Santos and Michael C. Brauer, Title: Digital position sensor system for detecting automatic transmission gear modes.

Some examples of hydraulic master cylinders which may be utilized in accordance with the present invention may be found in the following U.S. Patents: U.S. Pat. No. 5,211,099 entitled "Slave Cylinder for a Hydraulic Actuating System of a Motor Vehicle Friction Clutch" to Fichtel & Sachs; U.S. Pat. No. 5,213,187 entitled "Device Relating to a Semi-automatic Clutch for Vehicles"; U.S. Pat. No. 5,284,017 entitled "Hydraulic Master Cylinder" to Automotive Products; and U.S. Pat. No. 5,301,597 entitled "Hydraulic Cylinder" to Kugelfischer Schafer.

Some examples of clutch assemblies and various components associated therewith which could possibly utilize the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. Patents: U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. Patents: U.S. Pat. No. 4,634,190 to Wupper, entitled "Hydraulic Brake System With Slip Control"; U.S. Pat. No. 4,643,488 to Reinartz, entitled Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

The corresponding foreign patent publication applications, namely, Federal Republic of Germany Patent Application No. P 44 33 824.4, filed on Sep. 22, 1994, having inventors Udo Borschert, Lutz Leimbach, Ullrich Scherpf, Manfred Waning, Michael Zottmann, and DE-OS P 44 33 824.4 and DE-PS P 44 33 824.4, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. An actuator for a clutch assembly for a motor vehicle, said actuator comprising:

a housing;

a mechanical drive mechanism for converting a first geometric movement into a second geometric movement;

means for driving said mechanical drive mechanism;

said driving means being connected to said mechanical drive mechanism;

said mechanical drive mechanism having means for being connected to an output element for activating and deactivating a clutch assembly;

said mechanical drive mechanism comprising:
a worm gear
a worm gear wheel;
said worm gear wheel being in mesh with said worm gear;
said worm gear wheel being disposed within said housing;
said worm gear wheel for being moved in a first direction and a second direction;
said worm gear wheel having an outer circumferential portion;
said worm gear wheel comprising at least one notch;
at least one member for being engaged within said at least one notch;
said at least one notch having an inner circumferential portion;
said at least one member, engaged within said at least one notch, having an outer circumference;
a portion of said outer circumference of said at least one member engaged within said at least one notch being in contact with a portion of said inner circumferential portion of said at least one notch;
said inner circumferential portion of said at least one notch being insufficient by itself to hold said at least one member within said at least one notch;
means for retaining said at least one member within said at least one notch of said worm gear wheel; and
said means for retaining said at least one member within said at least one notch being disposed within said housing.

2. The actuator according to claim 1, wherein:
said means for retaining said at least one member within said at least one notch comprises a spring structure; and
said spring structure is disposed at least substantially adjacent said worm gear wheel.

3. The actuator according to claim 2, wherein:
said at least one notch comprises a first notch and a second notch;
said at least one member engaged within said at least one notch comprises a first fastening bolt and a second fastening bolt;
said first notch comprises means for connecting said worm gear wheel with said spring structure;
said second notch comprises means for connecting said worm gear wheel to an output element;
said first notch for connecting said worm gear wheel with said spring structure comprises means for disposing said first fastening bolt within said first notch;
said second notch for connecting said worm gear wheel with an output element comprises means for disposing said second fastening bolt within said second notch;
said means for disposing said first fastening bolt within said first notch is formed from an elastomer material; and
said means for disposing said second fastening bolt within said second notch is formed from an elastomer material.

4. The actuator according to claim 3, wherein:
said worm gear wheel defines an axis of rotation;
said worm gear wheel further comprises a hub;
said hub is disposed to surround said axis of rotation of said worm gear wheel;

said hub generally is formed from an elastomer material;
said housing further comprises a bearing neck;
said actuator further comprises means for connecting said bearing neck to said housing;
said bearing neck has one end being connected to said housing;
said hub of said worm gear wheel is mounted on said bearing neck;
said worm gear wheel is generally formed from an elastomer material; and
said worm gear wheel comprises a one-piece component.

5. The actuator according to claim 4, wherein:
said spring structure comprises a coil spring mechanism for storing energy;
said coil spring mechanism for applying a force with respect to said worm gear wheel;
said worm gear wheel is rotationally mounted on said bearing neck;
said worm gear wheel has an outer circumferential portion;
said outer circumferential portion of said worm gear wheel comprises a plurality of gear teeth;
said driving means further comprising an output shaft;
said output shaft has a plurality of gear teeth;
said plurality of gear teeth of said worm gear wheel are in mesh with said plurality of gear teeth of said output shaft;
said driving means further comprising an electric motor for providing movement of said output shaft;
said movement of said output shaft for providing movement of said worm gear wheel; and
said worm gear wheel comprises means for being operatively connected to an output element to activate a clutch assembly.

6. A hydraulically operated clutch assembly for a motor vehicle, said clutch assembly comprising:
means for hydraulically activating said clutch assembly;
said hydraulic activating means comprising means for actuating said clutch assembly;
said actuating means comprising:
a housing;
a mechanical drive mechanism for converting a first geometric movement into a second geometric movement;
means for driving said mechanical drive mechanism;
said driving means being connected to said mechanical drive mechanism;
a hydraulic master cylinder;
said mechanical drive mechanism having means for being connected to said hydraulic master cylinder for activating and deactivating said clutch assembly;
said mechanical drive mechanism comprising:
a worm gear;
a worm gear wheel;
said worm gear wheel being in mesh with said worm gear;
said worm gear wheel being connected within said housing;
said worm gear wheel being movable in a first direction and a second direction;
said worm gear wheel having an outer circumferential portion;
at least a portion of said worm gear wheel comprising a cut out portion;

a spring structure;

said spring structure being disposed within said housing;

said spring structure being disposed adjacent said worm gear wheel;

said spring structure having a first end and a second end;

said first end of said spring structure comprising pivot means for permitting pivoting of said spring structure about said first end of said spring structure;

said housing comprising mating pivot means for receiving said pivot means of said spring structure;

said pivot means of said spring structure together with said mating pivot means of said housing permit said spring structure to pivot with respect to said worm gear wheel;

said second end of said spring structure being disposed opposite said first end;

said second end of said spring structure being disposed adjacent a portion of said worm gear wheel;

said worm gear wheel being movable in said first direction to dispose said second end of said spring structure in contact with said outer circumferential portion of said worm gear wheel; and said worm gear wheel being movable in said second direction to dispose a portion of said spring structure within said cut out portion of said worm gear wheel.

7. The hydraulically operated clutch assembly according to claim 6, wherein:

said worm gear wheel defines an axis of rotation;

a distance is disposed between said axis of rotation and said outer circumferential portion of said worm gear wheel; and said cut out portion of said worm gear wheel comprises a substantial portion of the distance between said outer circumferential portion and said axis of rotation of said worm gear wheel.

8. The hydraulically operated clutch assembly according to claim 7, wherein:

said outer circumferential portion of said worm gear wheel comprises a first portion and a second portion;

said first portion and said second portion of said outer circumferential portion of said worm gear wheel are disposed to at least partially extend about said cut out portion of said worm gear wheel;

said cut out portion of said worm gear wheel is defined by said first portion and said second portion of said outer circumferential portion of said worm gear wheel; and said cut out portion of said worm gear wheel comprises means for preventing contact between said spring structure and at least one of: said first portion and said second portion of said outer circumferential portion of said worm gear wheel.

9. The hydraulically operated clutch assembly according to claim 8, wherein:

said first direction of movement of said worm gear wheel comprises a first predetermined angle of rotation of said worm gear wheel;

said second direction of movement of said worm gear wheel comprises a second predetermined angle of rotation of said worm gear wheel;

said housing further comprises stop means for preventing said worm gear wheel from exceeding a predetermined angle of rotation;

said worm gear wheel comprises an additional cut out portion;

said outer circumferential portion of said worm gear wheel further comprises a third portion and a fourth portion;

said third portion and said fourth portion of said outer circumferential portion are disposed to at least partially extend about said additional cut out portion of said worm gear wheel;

said additional cut out portion of said worm gear wheel further defines said first angle of rotation and said second angle of rotation of said worm gear wheel;

said additional cut out portion of said worm gear wheel is disposed to mate with said stop means;

said stop means for preventing said worm gear wheel from exceeding said at least one of: said first angle of rotation and said second angle of rotation;

said stop means comprises a pivot stop;

said pivot stop is disposed within said additional cut out portion of said worm gear wheel;

said pivot stop is disposed substantially between said third portion and said fourth portion of said outer circumferential portion of said worm gear wheel;

said pivot stop has a first end and a second end;

said clutch assembly further comprises means for connecting said first end of said pivot stop to said housing; and said pivot stop for being connected to said housing in a stationary manner.

10. The hydraulically operated clutch assembly according to claim 9, wherein:

said pivot stop has a first side and a second side;

each of said first side and said second side of said pivot stop comprises an elastomer material;

said first side of said pivot stop further comprises a limit of said first angle of rotation of said worm gear wheel;

said second side of said pivot stop further comprises a limit of said second angle of rotation of said worm gear wheel;

said worm gear wheel further comprises a hub;

said hub is disposed to surround said axis of rotation defined by said worm gear wheel;

said worm gear wheel further comprises a plurality of cheek portions;

said plurality of cheek portions comprise a pair of solid wheel portions;

said pair of solid wheel portions are disposed parallel to one another;

said pair of solid wheel portions are disposed to substantially surround said hub;

said pair of solid wheel portions are disposed an axial distance with respect to one another;

said spring structure comprises a spring mechanism for storing energy;

at least one of: said pair of solid wheel portions has at least one notch disposed therein;

said at least one notch in said solid wheel portion comprises means for connecting said worm gear wheel to at least one of: said spring mechanism and said hydraulic master cylinder; and said hub and said pair of solid wheel portions together form a single, unitary component.

11. The hydraulically operated clutch assembly according to claim 10, further comprising:
said means for connecting said worm gear wheel to said spring mechanism comprising a first notch;
said means for connecting said worm gear wheel to said hydraulic master cylinder comprising a second notch;
a first fastening bolt for being disposed in said first notch;
a second fastening bolt for being disposed in said second notch;
said first notch for connecting said worm gear wheel to said spring mechanism comprising means for disposing said first fastening bolt within said first notch;
said second notch for connecting said worm gear wheel to said hydraulic master cylinder comprising means for disposing said second fastening bolt within said second notch;
said first notch having a longitudinal dimension;
said second notch having a longitudinal dimension;
said spring mechanism for providing a spring action in a predetermined direction with respect to said worm gear wheel;
said longitudinal dimensions of said first notch and said second notch being oriented in a direction opposite said direction of said spring action of said spring mechanism, with respect to said worm gear wheel;
said spring mechanism comprising a tappet rod;
said tappet rod of said spring mechanism comprising a first end substantially adjacent said first notch in said wheel portion of said worm gear wheel;
said first end of said tappet rod comprising an eye;
said first fastening bolt for being disposed within said eye of said tappet rod;
said eye of said tappet rod comprising means for holding said first fastening bolt immovably and non-detachably within said first notch and thus connecting said spring mechanism to said worm gear wheel;
said hydraulic master cylinder comprising a piston rod;
said piston rod of said hydraulic master cylinder comprising a first end substantially adjacent said second notch in said wheel portion of said worm gear wheel;
said first end of said piston rod comprising an eye;
said second fastening bolt for being disposed within said eye of said piston rod;
said eye of said piston rod comprising means for holding said second fastening bolt non-detachably within said second notch and thus connecting said spring mechanism to said worm gear wheel;
said first fastening bolt being extrusion-coated with plastic to further hold said first fastening bolt within said first notch in said wheel portion of said worm gear wheel; and
said second fastening bolt being extrusion-coated with plastic to further hold said second fastening bolt within said second notch in said wheel portion of said worm gear wheel.

12. The hydraulically operated clutch assembly according to claim 11, wherein:
said first fastening bolt has a first end and a second end;
said first end of said first fastening bolt is disposed within said first notch of said wheel portion of said worm gear wheel;
said pair of solid wheel portions of said worm gear wheel further comprises a cover plate;
said first notch of said pair of solid wheel portions is disposed adjacent and in contact with a portion of said cover plate of said pair of solid wheel portions;
said second end of said first fastening bolt is disposed adjacent and in contact with a portion of said housing;
said first end of said first fastening bolt being in contact with said portion of said cover plate of said pair of solid wheel portions, and said second end of said first fastening bolt being in contact with said portion of said housing, further comprise said means for non-detachably holding said first fastening bolt within said first notch of said solid wheel portions of said worm gear wheel;
said second fastening bolt has a first end and a second end;
said first end of said second fastening bolt is disposed within said second notch of said pair of solid wheel portions of said worm gear wheel;
said second notch of said pair of solid wheel portions is disposed adjacent and in contact with a portion of said cover plate of said pair of solid wheel portions;
said second end of said second fastening bolt is disposed adjacent and in contact with a portion of said housing; and
said first end of said second fastening bolt being in contact with said portion of said cover plate of said pair of solid wheel portions, and said second end of said second fastening bolt being in contact with said portion of said housing, further comprise said means for non-detachably holding said second fastening bolt within said second notch of said pair of solid wheel portions of said worm gear wheel.

13. The hydraulically operated clutch assembly according to claim 12, further comprising:
a bearing neck;
said bearing neck being disposed within said housing;
means for connecting said bearing neck to said housing;
said bearing neck having one end being connected to said housing;
said worm gear wheel being rotationally mounted on said bearing neck;
said spring mechanism comprising a coil spring;
said worm gear wheel generally being formed from a plastic material;
a portion of said outer circumferential portion of said worm gear wheel comprising a plurality of gear teeth;
said driving means comprising an output shaft;
said output shaft having a plurality of gear teeth;
said plurality of gear teeth of said worm gear wheel being in mesh with said plurality of gear teeth of said output shaft;
said driving means further comprising an electric motor for providing movement of said output shaft;
said movement of said output shaft for providing movement of said worm gear wheel; and
said worm gear wheel comprising means for being operatively connected to said means for hydraulically activating said clutch assembly, to hydraulically activate said clutch assembly.

14. An actuator for actuating a hydraulically operated clutch assembly for a motor vehicle, said actuator comprising:
a housing;
a mechanical drive mechanism for converting a first geometric movement into a second geometric movement;

means for driving said mechanical drive mechanism;

said driving means being connected to said mechanical drive mechanism;

said mechanical drive mechanism having means for being connected to an output element for activating and deactivating the system;

said mechanical drive mechanism comprising:

a worm gear;

a worm gear wheel;

said worm gear wheel being in mesh with said worm gear;

said worm gear wheel being connected within said housing;

said worm gear wheel being movable in a first direction and a second direction;

said worm gear wheel having an outer circumferential portion;

at least a portion of said worm gear wheel comprising a cut out portion;

a spring structure;

said spring structure being disposed within said housing;

said spring structure being disposed adjacent said worm gear wheel;

said spring structure having a first end and a second end;

said first end of said spring structure comprising pivot means for permitting said spring structure to pivot about said first end of said spring structure;

said housing comprising mating pivot means for receiving said pivot means of said spring structure;

said pivot means of said spring structure together with said mating pivot means of said housing to permit said spring structure to pivot with respect to said worm gear wheel;

said second end of said spring structure being disposed opposite said first end;

said second end of said spring structure being disposed adjacent a portion of said worm gear wheel;

said worm gear wheel being movable in said first direction to dispose said second end of said spring structure in contact with said outer circumferential portion of said worm gear wheel;

said worm gear wheel being movable in said second direction to dispose a portion of said spring structure within said cut out portion of said worm gear;

said worm gear wheel defining an axis of rotation;

a distance being disposed between said axis of rotation and said outer circumferential portion of said worm gear wheel;

said cut out portion of said worm gear wheel comprising a substantial portion of the distance between said outer circumferential portion and said axis of rotation of said worm gear wheel;

said outer circumferential portion of said worm gear wheel comprising a first portion and a second portion;

said first portion and said second portion of said outer circumferential portion of said worm gear wheel being disposed to at least partially extend about said cut out portion of said worm gear wheel;

said cut out portion of said worm gear wheel being defined by said first portion and said second portion of said outer circumferential portion of said worm gear wheel;

said cut out portion of said worm gear wheel comprising means for preventing contact between said spring structure and at least one of: said first portion and said second portion of said outer circumferential portion of said worm gear wheel;

said first direction of movement of said worm gear wheel comprising a first predetermined angle of rotation of said worm gear wheel;

said second direction of movement of said worm gear wheel comprising a second predetermined angle of rotation of said worm gear wheel;

said housing further comprising stop means for preventing said worm gear wheel from exceeding a predetermined angle of rotation;

said worm gear wheel comprising an additional cut out portion;

said outer circumferential portion of said worm gear wheel further comprising a third portion and a fourth portion;

said third portion and said fourth portion of said outer circumferential portion being disposed to at least partially extend about said additional cut out portion of said worm gear wheel;

said additional cut out portion of said worm gear wheel further defining said first angle of rotation and said second angle of rotation of said worm gear wheel;

said additional cut out portion of said worm gear wheel being disposed to mate with said stop means;

said stop means for preventing said worm gear wheel from exceeding said at least one of: said first angle of rotation and said second angle of rotation;

said stop means comprising a pivot stop;

said pivot stop being disposed within said additional cut out portion of said worm gear wheel;

said pivot stop being disposed substantially between said third portion and said fourth portion of said outer circumferential portion of said worm gear wheel;

said pivot stop has a first end and a second end;

means for connecting said first end of said pivot stop to said housing; and said pivot stop for being connected to said housing in a stationary manner.

15. The actuator according to claim 14, wherein:

said pivot stop has a first side and a second side;

each of said first side and said second side of said pivot stop comprises an elastomer material;

said first side of said pivot stop further comprises a limit of said first angle of rotation of said worm gear wheel;

said second side of said pivot stop further comprises a limit of said second angle of rotation of said worm gear wheel;

said worm gear wheel further comprises a hub;

said hub is disposed to surround said axis of rotation defined by said worm gear wheel;

said worm gear wheel further comprises a plurality of cheek portions;

said plurality of cheek portions comprise a pair of solid wheel portions;

said pair of solid wheel portions are disposed parallel to one another;

said pair of solid wheel portions are disposed to substantially surround said hub;

said pair of solid wheel portions are disposed an axial distance with respect to one another;

said spring structure comprises a spring mechanism for storing energy;

at least one of: said pair of solid wheel portions has at least one notch disposed therein;

said at least one notch in said pair of solid wheel portions comprises means for connecting said worm gear wheel to at least one of: said spring mechanism and said output element; and said hub and said pair of solid wheel portions together form a single, unitary component.

16. The actuator according to claim 15, further comprising:

said means for connecting said worm gear wheel to said spring mechanism comprising a first notch;

said means for connecting said worm gear wheel to said output element cylinder comprising a second notch;

a first fastening bolt for being disposed in said first notch;

a second fastening bolt for being disposed in said second notch;

said first notch for connecting said worm gear wheel to said spring mechanism comprising means for disposing said first fastening bolt within said first notch;

said second notch for connecting said worm gear wheel to said output element comprising means for disposing said second fastening bolt within said second notch;

said first notch having a longitudinal dimension;

said second notch having a longitudinal dimension;

said spring mechanism for providing a spring action in a predetermined direction with respect to said worm gear wheel;

said longitudinal dimensions of said first notch and said second notch being oriented in a direction opposite said direction of said spring action of said spring mechanism, with respect to said worm gear wheel;

said spring mechanism comprising a tappet rod;

said tappet rod of said spring mechanism comprising a first end substantially adjacent said first notch in said wheel portion of said worm gear wheel;

said first end of said tappet rod comprising an eye;

said first fastening bolt for being disposed within said eye of said tappet rod;

said eye of said tappet rod comprising means for holding said first fastening bolt immovably and non-detachably within said first notch and thus connecting said spring mechanism to said worm gear wheel;

said output element comprising a rod;

said rod of said output element comprising a first end substantially adjacent said second notch in said wheel portion of said worm gear wheel;

said first end of said rod comprising an eye;

said second fastening bolt for being disposed within said eye of said rod;

said eye of said rod comprising means for holding said second fastening bolt non-detachably within said second notch and thus connecting said spring mechanism to said worm gear wheel;

said first fastening bolt being extrusion-coated with plastic to further hold said first fastening bolt within said first notch in said wheel portion of said worm gear wheel; and said second fastening bolt being extrusion-coated with plastic to further hold said second fastening bolt within said second notch in said wheel portion of said worm gear wheel.

17. The actuator according to claim 16, wherein:

said first fastening bolt has a first end and a second end;

said first end of said first fastening bolt is disposed within said first notch of said pair of solid wheel portions of said worm gear wheel;

said pair of solid wheel portions of said worm gear wheel further comprises a cover plate;

said first notch of said pair of solid wheel portions is disposed adjacent and in contact with a portion of said cover plate of said pair of solid wheel portions;

said second end of said first fastening bolt is disposed adjacent and in contact with a portion of said housing;

said first end of said first fastening bolt being in contact with said portion of said cover plate of said pair of solid wheel portions, and said second end of said first fastening bolt being in contact with said portion of said housing, further comprise said means for non-detachably holding said first fastening bolt within said first notch of said pair of solid wheel portions of said worm gear wheel;

said second fastening bolt has a first end and a second end;

said first end of said second fastening bolt is disposed within said second notch of said pair of solid wheel portions of said worm gear wheel;

said pair of solid wheel portions of said worm gear wheel further comprises a cover plate;

said second notch of said pair of solid wheel portions is disposed adjacent and in contact with a portion of said cover plate of said pair of solid wheel portions;

said second end of said second fastening bolt is disposed adjacent and in contact with a portion of said housing;

said first end of said second fastening bolt being in contact with said portion of said cover plate of said pair of solid wheel portions, and said second end of said second fastening bolt being in contact with said portion of said housing, further comprise said means for non-detachably holding said second fastening bolt within said second notch of said pair of solid wheel portions portion of said worm gear wheel;

said housing further comprising a bearing neck;

said bearing neck is disposed within said housing;

said actuator further comprises means for connecting said bearing neck to said housing;

said bearing neck has one end being connected to said housing;

said worm gear wheel is rotationally mounted on said bearing neck;

said spring mechanism comprises a coil spring;

said worm gear wheel generally is formed from a plastic material;

a portion of said outer circumferential portion of said worm gear wheel comprises a plurality of gear teeth;

said driving means comprises an output shaft;

said output shaft has a plurality of gear teeth;

said plurality of gear teeth of said worm gear wheel are in mesh with said plurality of gear teeth of said output shaft;

said driving means further comprises an electric motor for providing movement of said output shaft;

said movement of said output shaft for providing movement of said worm gear wheel; and said worm gear wheel is operatively connected to said output element for actuating a clutch assembly.

* * * * *